(12) United States Patent
Oonishi et al.

(10) Patent No.: US 8,234,064 B2
(45) Date of Patent: Jul. 31, 2012

(54) ROUTE GUIDANCE SYSTEM AND PROGRAM

(75) Inventors: Shino Oonishi, Okazaki (JP); Takaaki Nakayama, Okazaki (JP)

(73) Assignee: Aisin AW Co., Ltd., Aichi (JP)

( * ) Notice: Subject to any disclaimer, the term of this patent is extended or adjusted under 35 U.S.C. 154(b) by 642 days.

(21) Appl. No.: 12/377,452

(22) PCT Filed: Oct. 25, 2007

(86) PCT No.: PCT/JP2007/071272
§ 371 (c)(1),
(2), (4) Date: Feb. 13, 2009

(87) PCT Pub. No.: WO2008/053945
PCT Pub. Date: May 8, 2008

(65) Prior Publication Data
US 2010/0223002 A1    Sep. 2, 2010

(30) Foreign Application Priority Data
Oct. 31, 2006   (JP) .................................. 2006-296660

(51) Int. Cl.
*G01C 21/00*   (2006.01)
(52) U.S. Cl. ....................................... 701/437
(58) Field of Classification Search .................... 701/437
See application file for complete search history.

(56) References Cited

U.S. PATENT DOCUMENTS

| | | | |
|---|---|---|---|
| 6,269,304 B1 * | 7/2001 | Kaji et al. ..................... | 701/209 |
| 6,446,000 B2 * | 9/2002 | Shimabara .................... | 701/428 |
| 2001/0013837 A1 * | 8/2001 | Yamashita et al. ............ | 340/988 |
| 2001/0027377 A1 * | 10/2001 | Shimabara .................... | 701/209 |
| 2002/0053984 A1 * | 5/2002 | Yamashita et al. ............ | 340/988 |
| 2003/0074131 A1 * | 4/2003 | Barkowski et al. ........... | 701/200 |

(Continued)

FOREIGN PATENT DOCUMENTS

EP    1008834 A1    6/2000

(Continued)

OTHER PUBLICATIONS

ISR for PCT/JP2007/071272 dated Mar. 5, 2008.

*Primary Examiner* — Neal Sereboff
*Assistant Examiner* — Robert Sorey
(74) *Attorney, Agent, or Firm* — Lowe Hauptman Ham & Berner LLP

(57) ABSTRACT

It is possible to display a lane guide map that takes into consideration connections between each of the lanes (m1 to m8) and reduction in the visibility of the lane guide map is prevented. The invention includes a current position detecting unit; a lane list setting processing means that produces a lane list (LsI 1) that takes into consideration connections between each of the lanes for lane groups (LkI 1 to LkI 3) in road links that are present in a lane list display section; a rendering range determination processing means that determines whether or not the number of lanes in the lane list (LsI 1) is larger than the number of lanes that has been set in a display unit (35); and a display range adjustment processing means that selects predetermined lanes in the lane list (LsI 1) and displays only the selected lanes. Lanes that have a low display necessity can be removed.

6 Claims, 14 Drawing Sheets

U.S. PATENT DOCUMENTS

| | | | |
|---|---|---|---|
| 2005/0149262 A1* | 7/2005 | Oikubo | 701/211 |
| 2005/0261830 A1* | 11/2005 | Furukawa | 701/211 |
| 2006/0009904 A1* | 1/2006 | Sakashita et al. | 701/200 |
| 2008/0033643 A1* | 2/2008 | Shimizu | 701/209 |
| 2008/0036626 A1* | 2/2008 | Kim | 340/995.14 |
| 2009/0265102 A1 | 10/2009 | Tava et al. | |
| 2010/0292922 A1* | 11/2010 | Tanizaki et al. | 701/211 |

FOREIGN PATENT DOCUMENTS

| | | |
|---|---|---|
| JP | 2004117044 A | 4/2004 |
| JP | 2004239740 A | 8/2004 |
| JP | 2005-214630 A | 8/2005 |
| WO | WO 2004111574 A1 * | 12/2004 |
| WO | 2008022695 A1 | 2/2008 |

* cited by examiner

F I G . 5
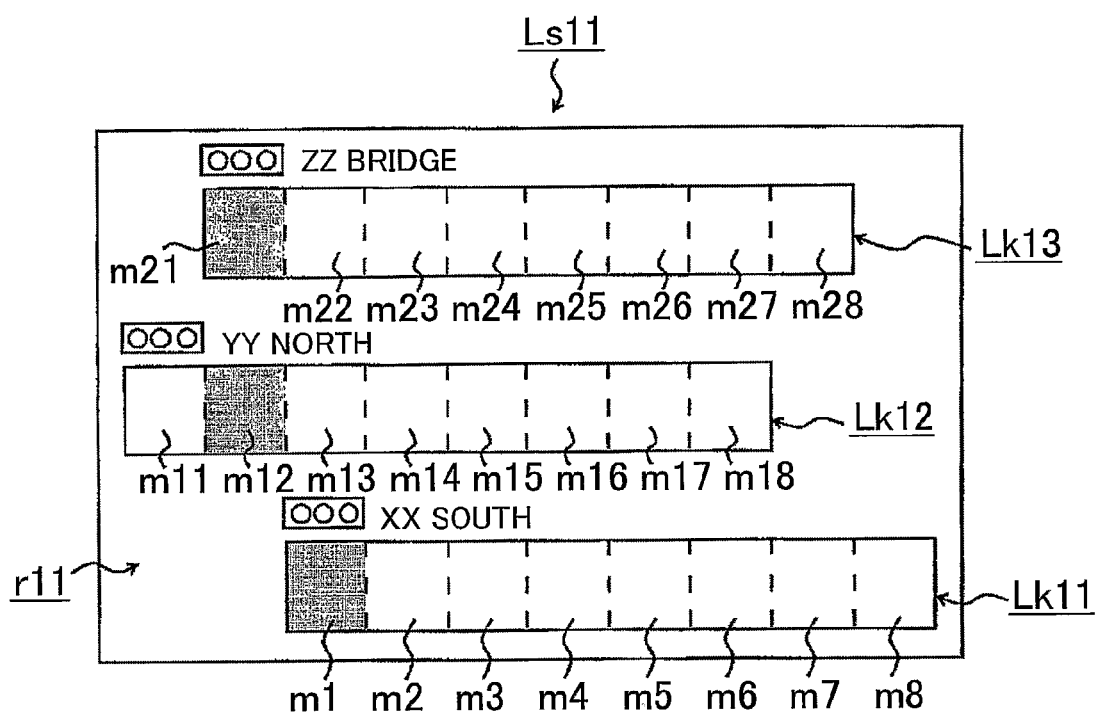
F I G . 6
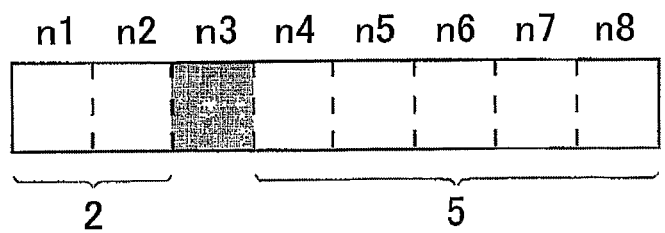

F I G . 7
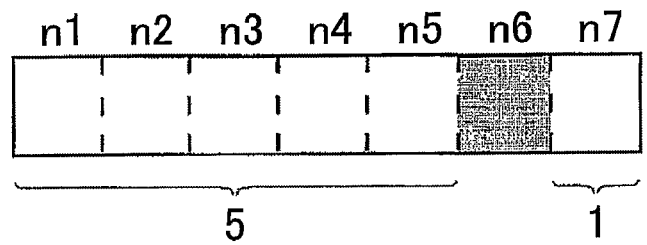
F I G . 8
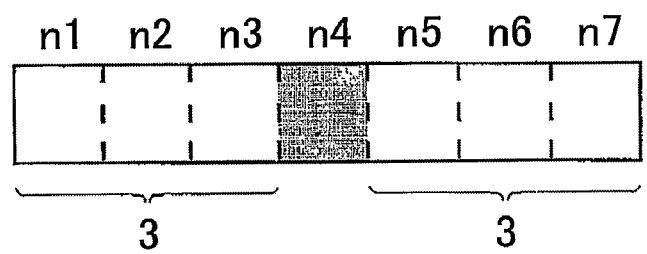
F I G . 9
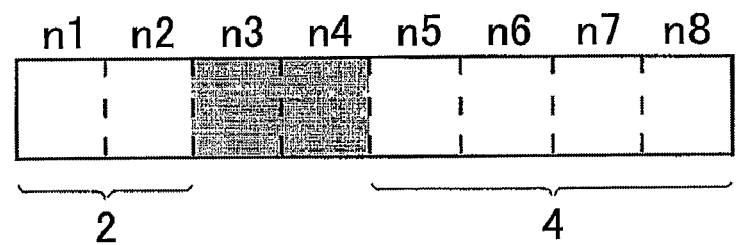
F I G . 10
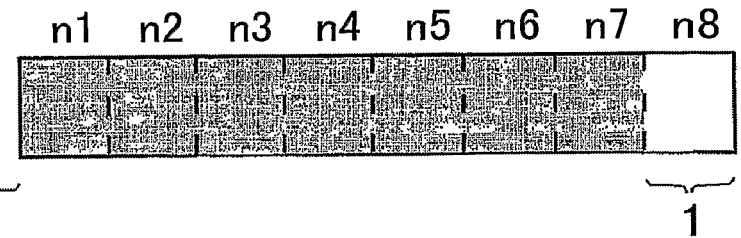

F I G . 20
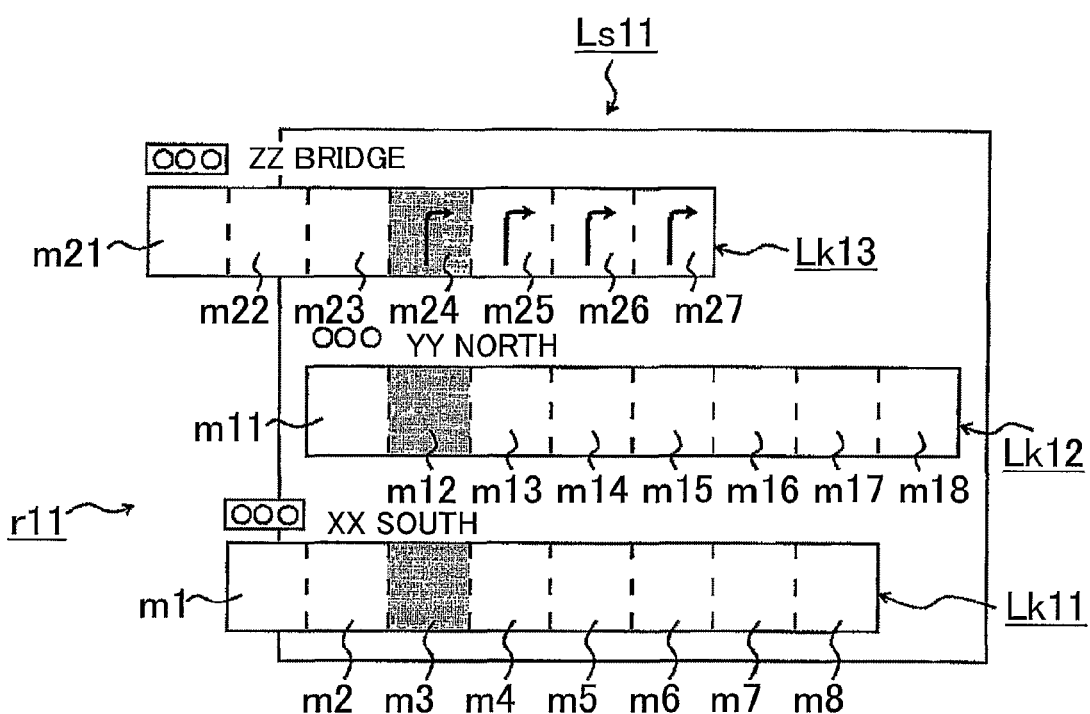

ROUTE GUIDANCE SYSTEM AND PROGRAM

TECHNICAL FIELD

The present invention relates to route guidance systems and programs.

BACKGROUND ART

Conventionally, in navigation apparatuses, when a driver inputs a destination and sets search conditions, route search processing is carried out based on the search conditions, and based on map data, a route from an origin, which is indicated by the position of the guided vehicle, to a destination, is retrieved. In addition, the route that has been retrieved, that is, the retrieved route, is displayed along with the position of the guided vehicle on a map screen that is formed in a display unit, and guidance about the retrieved route, that is, route guidance, is carried out. Thereby, it is possible for the driver to drive the vehicle along the displayed retrieved route.

However, when passing through an intersection on the retrieved route, in the case in which the road that forms the retrieved route has a plurality of lanes, a lane list, which serves as a lane guide map, is displayed in a predetermined screen that is formed in the display unit (refer, for example, to Patent Document 1).

FIG. 1 is a drawing that shows an example of a display of a conventional lane list, and FIG. 2 is a drawing that shows an example of a display of a lane list that takes into account the connections between each of the lanes.

In this case, a section within a range that is a predetermined distance ahead of the position of the guided vehicle is set as a lane list display section, and a lane list Ls1 is formed for each of the intersections in the lane list display section that have a traffic signal. Reference numeral r1 denotes a road, Lk1 denotes the lane group that contains the road link from the position of the guided vehicle to the "Umedashinmichi" intersection, Lk2 denotes the lane group that contains the road link from the "Umedashinmichi" intersection to the "Oebashi Minamizume", Lk3 denotes the lane group that contains the road link from the "Oebashi Minamizume" intersection to the "Yodoyabashi Kitazume" intersection, and Lk4 denotes the lane group that contains the road link from the "Yodoyabashi Kitazume" intersection to the "Yodoyabashi" intersection.

Lane group Lk1 includes lanes k1 to k5, lane group Lk2 includes lanes k11 to k18, lane group Lk3 includes lanes k21 to k28, and lane group Lk4 includes lanes k31 to k38, and in each of the lane groups Lk1 to Lk4, the lanes k2, k11, k21, and k31 are displayed as recommended lanes, in which travel is recommended, for each road link.

In addition, in the lane list Ls1, traffic sections that indicate the forward direction are determined for each of the lanes k1 to k5, k11 to k18, k21 to k28, and k31 to k38, and for each traffic section, arrows are appended that show the traffic direction, that is, the exit direction, at each of the intersections.

Specifically, the lanes k1 and k31 are left turn lanes, and arrows are appended that show that these lanes are left turn lanes. The lanes k2, k11, and k32 are left turn and through traffic lanes, and arrows are appended that show that these lanes are left turn and through traffic lanes. The lanes k3, k4, k12 to k16, k21 to k28, and k33 to k36 are through traffic lanes, and arrows are appended that show that these lanes are through traffic lanes. Lanes k5 and k37 are right turn and through traffic lanes, and arrows are appended that show that these lanes are right turn and through traffic lanes. Lanes k17, k18, and k38 are right turn lanes, and arrows placed showing that these lanes are right turn lanes.

In addition, because lanes k2, k11, k21, and k31 are recommended lanes, they are shown by making the color of the background that surrounds the arrows different so that they can be distinguished from the other lanes.

Therefore, on the retrieved route, in the case in which a left turn is made at the "Yodoyabashi" intersection after the vehicle has traveled forward along the road r1 up to the "Yodoyabashi" intersection, lane guidance is carried out so that the vehicle will pass through, in order, lanes k2, k11, k21, and k31. Note that the "Yodoyabashi" intersection is a retrieved route and a guided intersection at which guidance about the vehicle turning left, right, or travelling forward, is provided.

However, as shown in FIG. 2, in the actual road r1, because lane k2 and lane k14 are connected, lane k11 and lane k23 are connected, and lane k21 and lane k31 are connected, when the guided vehicle attempts to travel along lanes k2, k11, k21, and k31, which are the recommended lanes, the guided vehicle travels along lane k2 in the road link from the position of the guided vehicle to the "Umedashinmichi" intersection, enters lane k14 at the "Umedabashimichi" intersection, moves from lane k14 to lane k11 in the road link between the "Umedashinmichi" intersection and the "Oebashi Minamizume" intersection, enters lane k23 at the "Oebashi Minamizume" intersection, moves from lane k23 to k21 in the road link between the "Oebashi Minamizume" intersection and the "Yodoyabashi Kitazume" intersection, enters the lane k31 at the "Yodoyabashi Kitazume" intersection, travels along lane 31 in the road link between the "Yodoyabashi Kitazume" intersection and the "Yodoyabashi" intersection, and turns left at the "Yodoyabashi" intersection.

Thus, it is possible to consider displaying the lane list by taking into consideration the connections between each of the lanes between the lane groups Lk1 to Lk4 for each of the road links such that it is possible for the driver to recognize whether it is necessary move between lanes in each of the road links, and how the movement between lanes in each of the road links needs to be carried out, and such that, at each of the intersections such as those that are shown in FIG. 2, the road links at which an intersection is entered; that is, an entrance road, and a road at which an intersection is exited, that is, an exit road, are connected.

[Patent Document 1] Japanese Patent Application Publication No. JP-A-2005-214630

DISCLOSURE OF THE INVENTION

Problems to be Solved by the Invention

However, in conventional navigation apparatuses, because of, for example, restrictions on the dimensions of the display unit, the maximum number of lanes that can be displayed together is arbitrarily determined, and for example, in the case in which a lane list such as the one that is shown in FIG. 2 is displayed, there are 10 lanes arranged between the leftmost lanes k21 and k31 and the rightmost lane k18 among all of the lanes k1 to k5, k11 to k18, k21 to k28, and k31 to k38, and the size of the lane list exceeds the maximum rendering range of the lane display unit.

Thus, when rendering each of the lanes k1 to k5, k11 to k18, k21 to k28, and k31 to k38, reducing the size, that is, the width in the transverse direction, can be considered, but in this case, the visibility of the lane list is reduced.

It is an object of the present invention to provide a route guidance system and programs that solve the problems of the conventional navigation apparatus, can display lane guide maps that take into consideration the connections between each of the lanes, and prevent the visibility of the lane guide maps from being reduced.

Means for Solving the Problem

In order to solve the problems described above, the route guidance system of the present invention includes a current position detecting unit that detects the current position of the vehicle as the position of the guided vehicle; a lane list setting processing means that produces a lane list that takes into account the connections between each of the lanes for a lane group of a road link that are present in a lane list display section that has been set ahead of the position of the guided vehicle; a rendering range determination processing means that determines whether or not the number of lanes in the lane list is larger than the number of lanes that has been set in the display unit; and a display range adjustment processing means that selects predetermined lanes in the lane list and displays only the selected lanes in the case in which the number of lanes in the lane list is larger than the number of lanes that has been set in the display unit.

Effects of the Invention

According to the present invention, in the case in which the number of lanes in a lane list that takes into consideration the connections between each of the lanes is larger than the number of lanes that has been set in the display unit, predetermined lanes in the lane list are selected, and only the selected lanes are displayed. Thus, lanes that have a low display necessity can be removed from the display range. Therefore, it is possible to display reliably the main portion of a lane list that takes into account the connections between each of the lanes.

In addition, because the size of each of the rendered lanes does not need to be made small, it is possible to prevent the visibility of the lane list from being reduced.

BRIEF DESCRIPTION OF THE DRAWINGS

FIG. 5 is a drawing that shows an example of a lane list that takes into account the connections between lanes in the first embodiment of the present invention.

FIG. 6 is a first drawing that shows the recommended lane position determining process method in the first embodiment of the present invention.

FIG. 7 is a second drawing that shows the recommended lane position determining process method in the first embodiment of the present invention.

FIG. 8 is a third drawing that shows the recommended lane position determining process method in the first embodiment of the present invention.

FIG. 9 is a fourth drawing that shows the recommended lane position determining process method in the first embodiment of the present invention.

FIG. 10 is a fifth drawing that shows the recommended lane position determining process method in the first embodiment of the present invention.

FIG. 20 is a second drawing that shows an example of the display of the lane list in the second embodiment of the present invention.

BRIEF EXPLANATION OF THE SYMBOLS

10 automatic transmission control unit
14 navigation apparatus
15 GPS sensor
51 information center
63 network
Ls1, Ls11 lane lists
Lk1-4, Lk11-13 lane groups

BEST MODES FOR CARRYING OUT THE INVENTION

Below, embodiments of the present invention will be explained in detail with reference to the figures. Note that a navigation apparatus that serves as a route guidance system will be explained.

Figure 1:
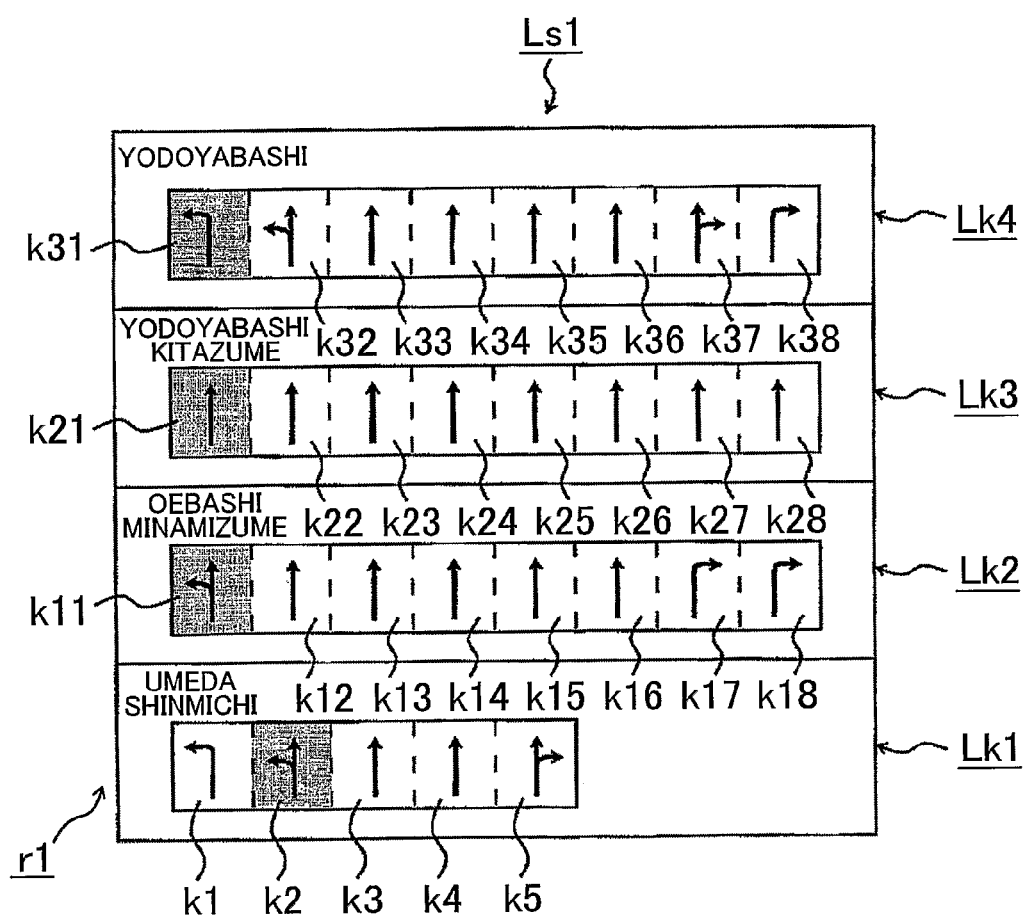
FIG. 1 is a drawing that shows an example of the display of a conventional lane list.
Figure 2:
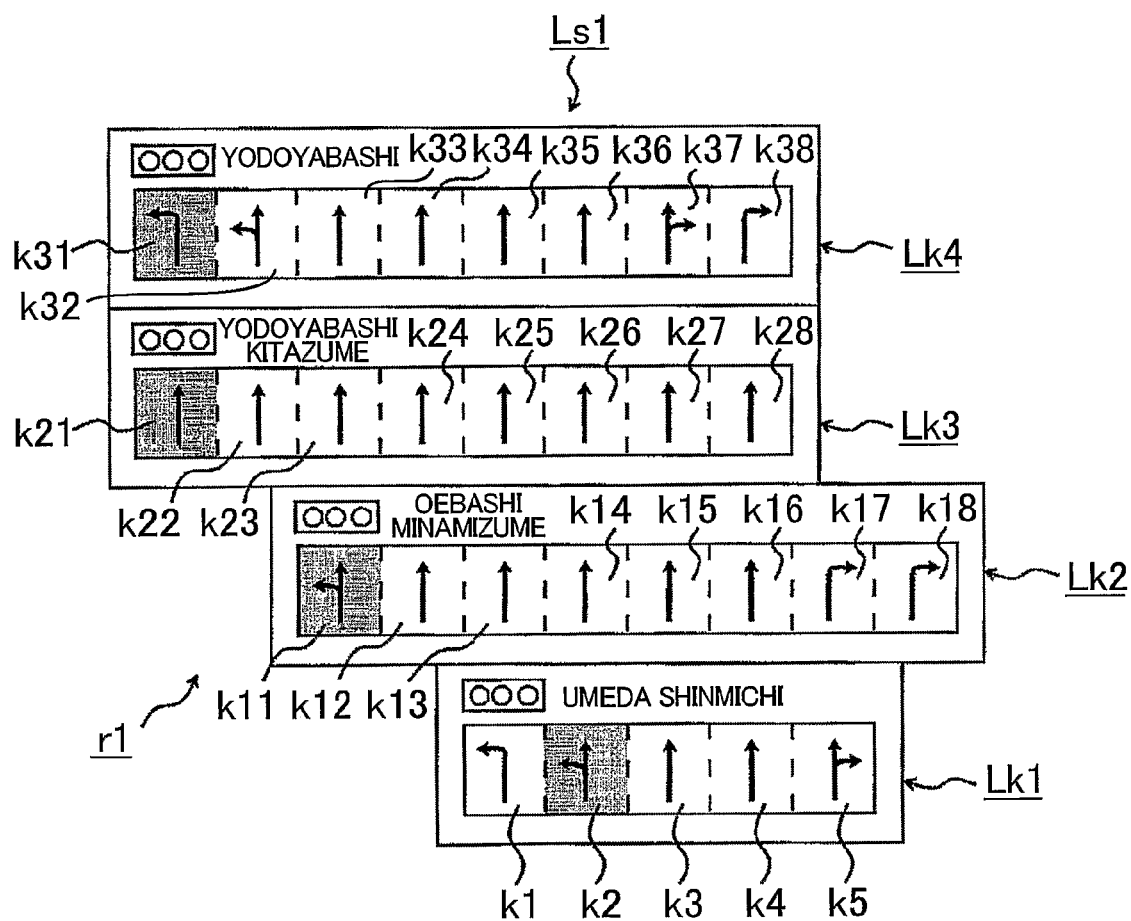
FIG. 2 is a drawing that shows an example of the display of a lane list that takes into account the connections between each of the lanes.
Figure 3:
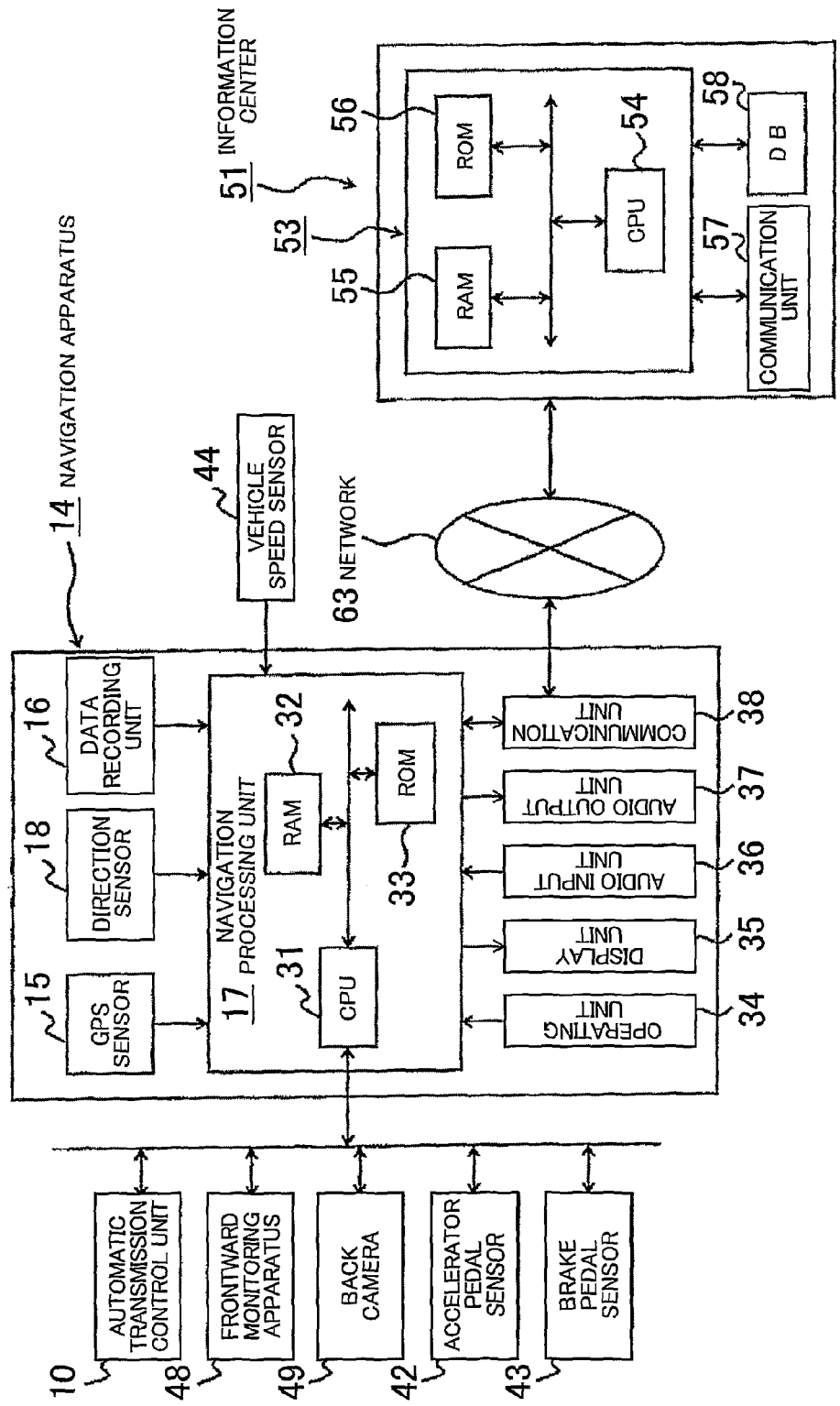
FIG. 3 is a drawing that shows the navigation system in a first embodiment of the present invention.

FIG. 3 is a drawing that shows the navigation system in a first embodiment of the present invention.

In the figure, reference numeral 10 denotes an automatic transmission control unit, and this automatic transmission control unit 10 carries out control of the automatic transmission. In addition, reference numeral 14 denotes a data terminal, for example, a navigation apparatus, which is a mounted apparatus that is installed on a vehicle, 63 denotes a network, and 51 denotes an information center that serves as an information provider. The navigation system is structured by the automatic transmission control unit 10, the navigation apparatus 14, the network 63, the information center 51 and the like.

The navigation apparatus 14 is provided with a GPS sensor 15 that serves as a current position detecting unit that detects the current position of the vehicle as the position of the guided vehicle; a data recording unit 16 that serves as an information recording unit in which, in addition to map data, various types of information are recorded; a navigation processing unit 17 that carries out various types of arithmetic processing such as navigation processing; a direction sensor 18 that serves as a direction detecting unit that detects the direction of the vehicle as the direction of the guided vehicle; an operating unit 34 that serves as a first input unit, and the driver, who is the operator, makes prescribed inputs by operating the same; a display unit 35 that serves as a first output unit for carrying out various types of display by using images that are rendered on a screen (not illustrated) and providing notifications to the driver; an audio input unit 36 that serves as a second input unit, and the driver makes prescribed inputs by using audio; an audio output unit 37 that serves as a second output unit for carrying out various types of display by using audio and providing notifications to the driver; and a communication unit 38 that serves as a transceiving unit that functions as a communication terminal; and the GPS sensor 15, the data recording unit 16, the direction sensor 18, the operating unit 34, the display unit 35, the audio input unit 36, the audio output unit 37, and the communication unit 38 are connected to the navigation processing unit 17.

In addition, the following are connected to the navigation processing unit 17: a frontward monitoring apparatus 48 that monitors the area in the front of the vehicle; a back camera (a rearward monitor camera) 49 that serves as an image capturing apparatus that photographs the area to the rear of the vehicle and serves as a rearward direction monitoring apparatus; an accelerator pedal sensor 42 that serves as an engine load detecting unit, which detects the operation of the accelerator pedal (not illustrated) by the driver according to the accelerator pedal open angle; a brake pedal sensor 43 that serves as a braking detecting unit, which detects the operation of the brake pedal (not illustrated) by the driver according to the brake pedal depression amount; and a vehicle speed sensor 44 that serves as a vehicle speed detecting unit that detects the vehicle speed.

Note that the accelerator pedal sensor 42, the brake pedal sensor 43 and the like structure the operation detecting unit for detecting the operation of the vehicle by the driver. Specifically, the accelerator pedal sensor 42 structures an acceleration operation detecting unit that detects an operation in which the driver intends to accelerate the vehicle, and the brake pedal sensor 43 structures a deceleration operation detecting unit that detects an operation in which the driver intends to decelerate the vehicle.

The GPS sensor 15 detects the current position of the vehicle on the surface of the earth, along with the time.

The data recording unit 16 is provided with a map database (not illustrated) that includes map data files, and the map data is recorded in this map database. This map data includes feature data related to features on the road, in addition to including intersection data that is related to intersections (branches), node data that is related to nodes, road data that is related to road links, search data that is prepared for retrieval, and facility data that is related to facilities.

The features are indicators that are disposed or formed on the road for providing various types of information for travel and carrying out various types of guidance for travel to the driver. These indicators include, for example, traffic display lines, road signs, crosswalks, manholes, signals and the like. The lane marks include, for example, stop lines for stopping a vehicle, vehicle traffic boundary lines that divide each of the lanes, section lines that indicate parking spaces, and the like, and the road signs include traffic section signs that indicate the forward direction in each of the lanes by using an arrow and guidance signs such as "stop", and the like, that provide warnings about temporary stopping locations. In addition, the feature data includes, for example, position data that indicates the position of each of the features by using coordinates and image information that shows each of the features by using images. Note that a temporary stopping location includes an entrance location from a non-prefectural road to a prefectural road, rail crossings, intersections at which red signals are flashing, and the like.

In addition, for each of the road links, the road data that is related to lanes includes lane data, which serves as lane information, consisting, for example, of the number of lanes, a lane number that is appended to each of the lanes of the road, the positions of the lanes, and the exit direction at an intersection for each of the lanes. The data for outputting predetermined information by using the audio output unit 37 is also recorded in the data recording unit 16.

Furthermore, a statistics database (not illustrated) that includes a statistics data file and a travel history database (not illustrated) that includes a travel history data file are formed in the data recording unit 16, and the statistical data is recorded in the statistics data file as cumulative data and travel history data is recorded in the travel history data file as cumulative data.

Additionally, in order to record various types of data, in addition to being provided with a disk (not illustrated) such as a hard disk, a CD, a DVD, or an optical disk or the like, the data recording unit 16 is provided with head (not illustrated) such as a read/write head for reading and writing the various types of data. In addition, it is possible to use a memory card or the like in the data recording unit 16. Note that the external storage apparatus is structured by the above disk, memory card, and the like.

In the present embodiment, the map database, the statistics database, the travel history database and the like are produced in the data recording unit 16. However, it is possible to produce the map database, statistics database, and the travel history database and the like at the information center 51.

In addition, the navigation processing unit 17 is provided, for example, with a CPU 31 that serves as a control apparatus for carrying out overall control of the navigation apparatus 14 and that serves as an arithmetic apparatus; a RAM 32 that is used as a working memory when the CPU 31 carries out various types of arithmetic processing; a ROM 33 on which, in addition to control programs, various types of programs for retrieving a route to a destination, carrying out route guidance, and the like, are recorded; and a flash memory (not illustrated) and the like that is used in order to record the various types of data, programs, and the like. Note that the internal memory apparatus is structured, for example, by the RAM 32, ROM 33, and the flash memory.

It is possible to use a keyboard or a mouse or the like (not illustrated) as an operation unit 34 that is installed separately from the display unit 35. In addition, as an operating unit 34, it is possible to use a touch panel that enables the carrying out of prescribed input operations by touching or clicking an image operating unit such as various types of keys, switches, or buttons, or the like, that are displayed as an image on the screen that is formed by the display unit 35.

A display is used as the display unit 35, and in the various types of screen that are produced on the display unit 35, the current position of the vehicle can be displayed as the position of the guided vehicle, the direction of the vehicle can be displayed as the direction of the guided vehicle, the maps, retrieved routes, the guidance information along the retrieved routes, traffic information and the like can be displayed, and the distance to the next intersection in the retrieved route and the forward direction at the next intersection can be displayed.

In addition, the audio input unit 36 is structured by a microphone or the like (not illustrated), and can input necessary information by voice. Furthermore, the audio output unit 37 is provided with a voice synthesizing apparatus (not illustrated) and a speaker, and the retrieved routes, the guidance information, the traffic information and the like are output from the audio output unit 37, for example, by a voice that has been synthesized by the voice synthesizing apparatus.

The communication unit 38 is provided with a beacon receiver (not illustrated) in order to receive various types of information such as the present traffic information, general information and the like that has been broadcast from a road traffic information center and an FM receiver (not illustrated) or the like in order to receive the above information as an FM multiplex broadcast via a FM broadcast station (not illustrated). Additionally, in addition to data such as the map data, statistics data, travel history data, and the like that are received from the information center 51, the communication unit 38 can receive various types of information such as traffic information, general information, and the like, via the network 63.

Thus, the information center 51 is provided, for example, with a server 53, a communication unit 57 that is connected to the server 53, and a database (DB) 58 that serves as an information recording unit, and the server 53 is provided, for example, with a CPU 54 that serves as a control apparatus and an arithmetic apparatus, a RAM 55, and a ROM 56. In addition, data that is similar to the various types of data that is stored in the data recording unit 16 is recorded in the database 58.

Note that the navigation system, the navigation processing unit 17, the CPUs 31 and 54, the server 53 and the like function as a computer singly or in a combination of two or more, and carry out arithmetic processing based on the various types of program, data, and the like. In addition, the recording medium is structured by the data recording unit 16, RAMs 32 and 55, ROMs 33 and 56, the database 58, a flash memory, and the like. In addition, it is possible to use an MPU or the like as the arithmetic apparatus instead of the CPUs 31 and 54 as the arithmetic unit.

Next, the basic operation of a navigation system having the structure that has been described above will be explained.

First, when the operating unit 34 is operated by the driver and the navigation apparatus 14 is activated, the navigation initiation processing means (not illustrated) of the CPU 31 carries out navigation initiation processing, and the position of the guided vehicle that has been detected by the GPS sensor 15 and the direction of the guided vehicle that has been detected by the direction sensor 18 are read, and the various types of data are initialized. Next, a matching processing means (not illustrated) in the CPU 31 carries out matching processing, and the position of the guided vehicle is specified by determining whether the guided vehicle is positioned on any road links based on the locus of the position of the guided vehicle that has been read, the contours and arrangement of each of the road links that form the road in the vicinity of the position of the guided vehicle, and the like.

In addition, in the present embodiment, the matching processing means further specifies the position of the guided vehicle based on the positions of features that are photographed objects photographed by the back camera 49.

Thereby, an image recognition processing means (not illustrated) in the CPU 31 carries out image recognition processing, the image data is read from the back camera 49, and the features in the image, which consists of the image data, are recognized. In addition, a distance calculation processing means (not illustrated) in the CPU 31 carries out distance calculation processing, and calculates the actual distance from the back camera 49 to a feature based on the position of the feature in an image. In addition, a guided vehicle position specification processing means in the matching processing means carries out guided vehicle position specification processing, reads the distance, acquires the coordinates of the feature by reading the feature data from the data recording unit 16, and specifies the position of the guided vehicle based on the coordinates and the distance thereof.

In addition, the travel lane specification processing means (not illustrated) in the CPU 31 carries out travel lane specification processing, and similarly, specifies the position of the guided vehicle by referring to features that have been recognized based on the image data, and feature data and lane data that have been read from the data recording unit 16, and specifies the travel lane along which the vehicle is travelling based on the position of the specified guided vehicle.

Note that the travel lane specification processing means reads the sensor output of the terrestrial magnetism sensor (not illustrated), and based on this sensor output, determines whether or not there are any detected objects that consist of a ferromagnetic material, such as a manhole, in a predetermined lane on the road, and can specify the travel lane based on the results of this determination. Furthermore, the position of the guided vehicle can be detected with high precision by using a high precision GPS sensor, and based on the detected results, it is possible to determine the lane in which the vehicle is travelling. In addition, when necessary, it is possible to specify the travel lane by carrying out image processing on the image data of the lane marks, and simultaneously, combining the sensor output of the terrestrial magnetism sensor and the position of the guided vehicle.

Next, the basic information acquisition processing means (not illustrated) in the CPU 31 carries out basic information acquisition processing, and either reads out and acquires the map data from the data recording unit 16, or receives and acquires the map data from the information center 51 via the communication unit 38. Note that in the case in which the map data is acquired, for example, from the information center 51, the basic information acquisition processing means downloads the received map information to flash memory.

In addition, the display processing means (not illustrated) in the CPU 31 carries out display processing, and forms various types of screens in the display unit 35. For example, the map display processing means in the display processing means carries out map display processing, and forms a map screen in the display of the display unit 35, displays the map of the vicinity in the map screen, and displays the position of the guided vehicle and the direction of the guided vehicle.

Therefore, the driver can drive the vehicle according to the maps, the position of the guided vehicle, and the direction of the guided vehicle.

In addition, when the driver inputs a destination by operating the operating unit 34, the destination setting processing means (not illustrated) in the CPU 31 carries out the destination setting processing to set the destination. Note that, when necessary, it is possible to input and set the origin. In addition, predetermined locations can be registered in advance, and it is possible to set the registered locations as destinations. Next, when the driver inputs the search conditions by operating the operating unit 34, the search condition setting processing means (not illustrated) in the CPU 31 carries out the search condition setting processing, and sets the search conditions.

When the destination and search conditions have been set in this manner, the route search processing means (not illustrated) in the CPU 31 carries out the route search processing, reads the position of the guided vehicle, the destination, the search conditions and the like, reads the search data and the like from the data recording unit 16, and based on the position of the guided vehicle, the destination, the search data and the like, searches for routes from the origin, which indicates the position of the guided vehicle, to the destination by using the search conditions, and outputs the route data, which indicates the retrieved route. At this time, the route that is set as the retrieved route is the one for which the total of the link cost, to which each of the road links contributes, is the smallest.

In addition, it is possible to carry out the route search processing at the information center 51. In this case, the CPU 31 transmits the position of the guided vehicle, the destination, the search conditions and the like to the information center 51 via the communication unit 38 and the network 63. When the information center 51 receives the position of the guided vehicle, the destination, the search conditions and the like, a route search processing means (not illustrated) in the CPU 54 carries out route search processing that is similar to that of the CPU 31, reads the search data and the like from a database 58, and based on the position of the guided vehicle, the destination, and the search data, retrieves routes from the origin to the destination by using the search conditions, and outputs route data that indicates the retrieved routes. Next, a transmission processing means (not illustrated) in CPU 54 carries out the transmission processing, and transmits the route data to the navigation apparatus 14 via the network 63.

Next, a guidance processing means (not illustrated) in the CPU 31 carries out guidance processing, and carries out route guidance. Thus, the route display processing means in the guidance processing means carries out the route display processing, reads the route data, and displays the retrieved route in the map screen according to the route data.

In this connection, in this route guidance, in the case in which it is necessary to carry out guidance for turning the vehicle left or right or travelling forward at a predetermined intersection, the intersection is set as a guided point and as a guided intersection. Thus, a guided intersection setting processing means in the guidance processing means carries out guided intersection setting processing, and depending on the route data, that is, based on the retrieved route, determines whether or not there is an intersection that requires the vehicle to turn left or right, or to travel forward. In the case in which there is an intersection that requires the vehicle to turn left or right or to travel forward, the intersection is set as a guided intersection.

Next, the enlarged guided point figure formation processing means in the guidance processing means carries out enlarged guided point figure formation processing, and before the vehicle arrives at the guided intersection, an enlarged figure of the guided intersection, that is, an enlarged intersection figure that serves as an enlarged guided point figure, is formed in a predetermined area of the map screen, and the route guidance is carried out by using the enlarged intersection figure. In order to carry out the route guidance, when an enlarged guided point figure display location has been set at a location that is separated by a set distance ahead of the guided intersection on the retrieved route (on the side of the position of the guided vehicle) and the vehicle has arrived at the enlarged guided point figure display location, the enlarged intersection figure is displayed.

In this case, for example, a map of the vicinity of the guided intersection, the retrieved route, and landmarks such as facilities that serve as indicators in the guided intersection are displayed in the enlarged intersection figure. Note that in a highway, an urban highway, a pay road dedicated to vehicles, such as a toll road, intersections that merge or branch at junctions or the like, are set as guided intersections.

In addition, a route guidance location setting processing means in the guidance processing means carries out route guidance location setting processing, and at a locations that are separated by set distances ahead of the guided intersection on the retrieved route, one or more, or, in the present invention, a plurality of retrieved guidance locations is set, and when the vehicle reaches each of the route guidance locations, the audio output processing means in the guidance processing means carries out audio output processing, and for the guided intersections, route guidance having a content that is set in advance for each of the route guidance locations is output by audio, or specifically, guide phrases are output from the audio output unit 37.

Thus, the guide phrases for carrying out lane guidance are set in advance for each combination of travel lane and recommended lane, or for distances from the route guidance location to the guided intersection and the like, and recorded as a guide phrase map in the data recording unit 16.

In addition, in the case in which a road that has a plurality of lanes is included in the retrieved route, the lane guidance processing means in the guidance processing means carries out lane guidance processing and reads the retrieved routes. The intersection data, lane data, and the like are read out, and the lane guidance is carried out based on the retrieved routes, the intersection data, the lane data and the like. Thus, the recommended lane setting processing means in the lane guidance processing means carries out recommended lane setting processing, and calculates and sets the recommended lane in each of the road links based on an exit direction that separately indicates the left or right turn or forward travel at each of the guided intersections on the retrieved route, the arrangement of the lanes in the exit road of the guided intersection, and the like.

Additionally, the lane display processing means in the lane guidance processing means carries out lane display processing, partitions the screen of the display unit 35 into two parts, left and right, to form a first and a second guidance screen, sets the first guidance screen as the map display unit and sets the second guidance screen as the lane display unit, and displays the map in the map display unit and the lane list, which serves as the lane guide map, in the lane display unit. Note that the lane display processing means can set the lane display unit in a portion of the map screen of the display unit 35 and display the lane list in the lane display unit.

In addition, the lane display processing means reads the lane number of the recommended lane, and displays the recommend lane in the lane group for each of the road links in the lane list. In the present embodiment, the recommended lane is displayed by, for example, making the color of the background that surrounds the arrow that indicates the forward travel direction different so as to be distinguishable from the other lanes. In addition, it is possible to display the arrow by making the arrow different from the arrows of the other lanes.

Next, the guided processing means in the lane guidance processing means carries out guided processing, reads the travel lane from the travel lane specification processing means and reads the recommended lane from a recommended lane calculation processing means, and based on the position of the guided vehicle, calculates the distance from the position of the guided vehicle to the guided intersection, refers to the guide phrase map, and reads guide phrases that correspond to the travel lane, the recommended lane, and the distance.

In addition, the guided processing means activates the voice synthesizing apparatus, outputs guide phrases by a synthesized voice from the speaker of the audio output unit 37 and guides the vehicle from the travel lane to the recommended lane.

Next, the operation of the lane display processing means will be explained.

Figure 4:
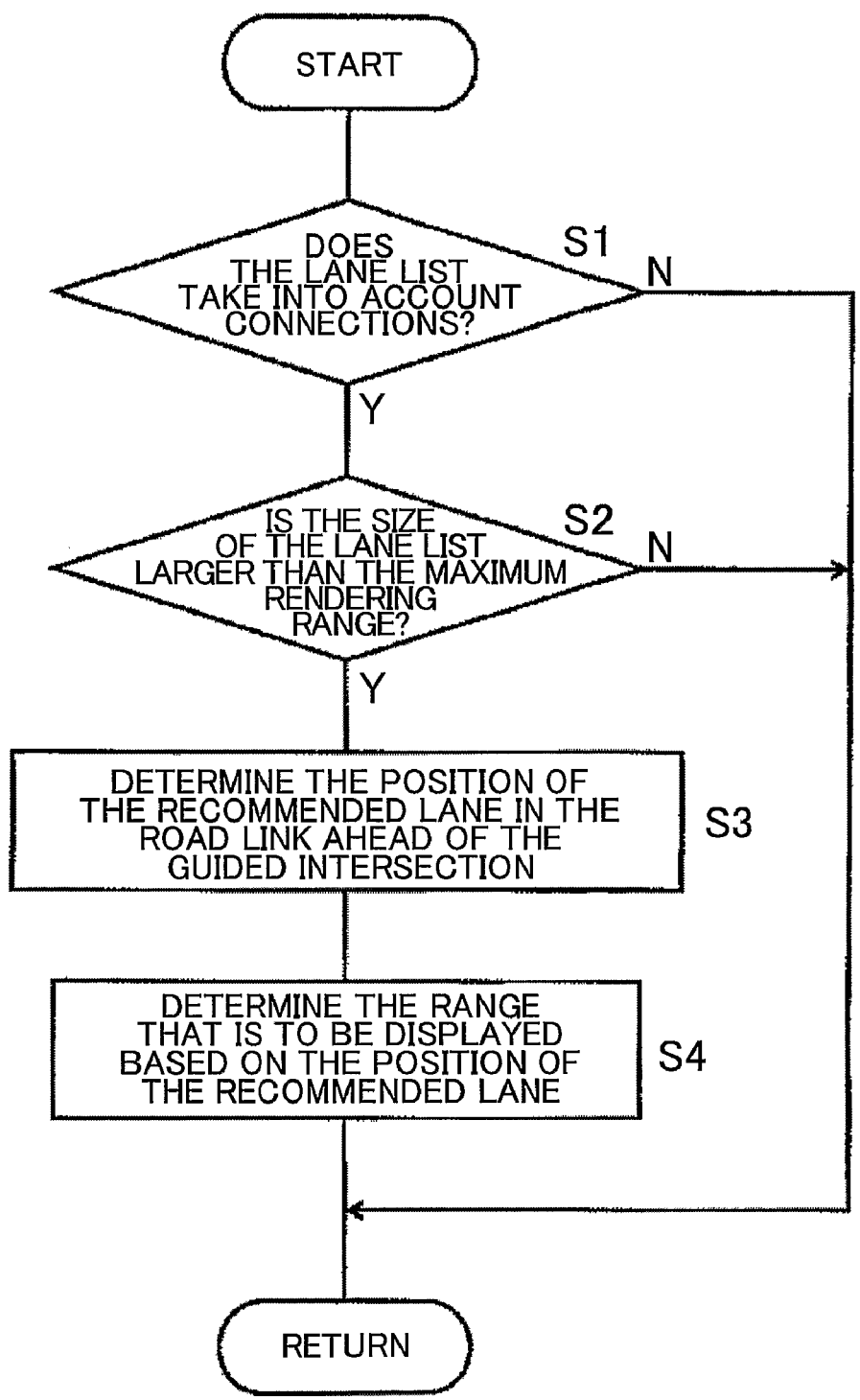
FIG. 4 is a flowchart that shows the operation of the lane display processing means in the first embodiment of the present invention.
Figure 11:
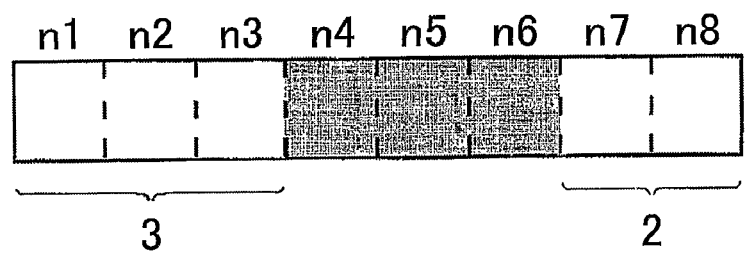
FIG. 11 is a sixth drawing that shows the recommended lane position determining process method in the first embodiment of the present invention.
Figure 12:
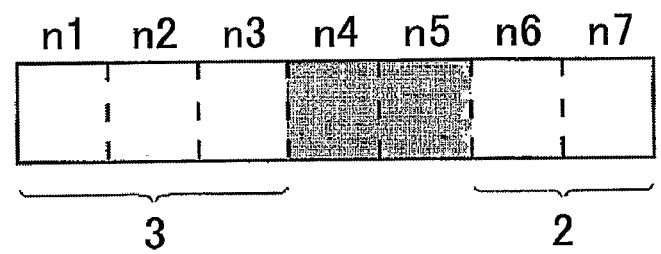
FIG. 12 is a seventh drawing that shows the recommended lane position determining process method in the first embodiment of the present invention.
Figure 13:
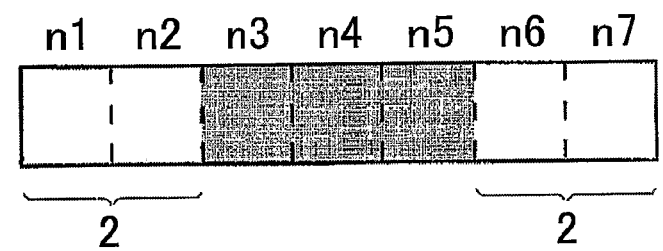
FIG. 13 is a eighth drawing that shows the recommended lane position determining process method in the first embodiment of the present invention.
Figure 14:
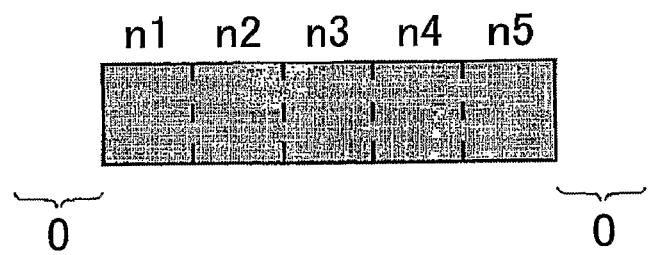
FIG. 14 is a ninth drawing that shows the recommended lane position determining process method in the first embodiment of the present invention.
Figure 15:
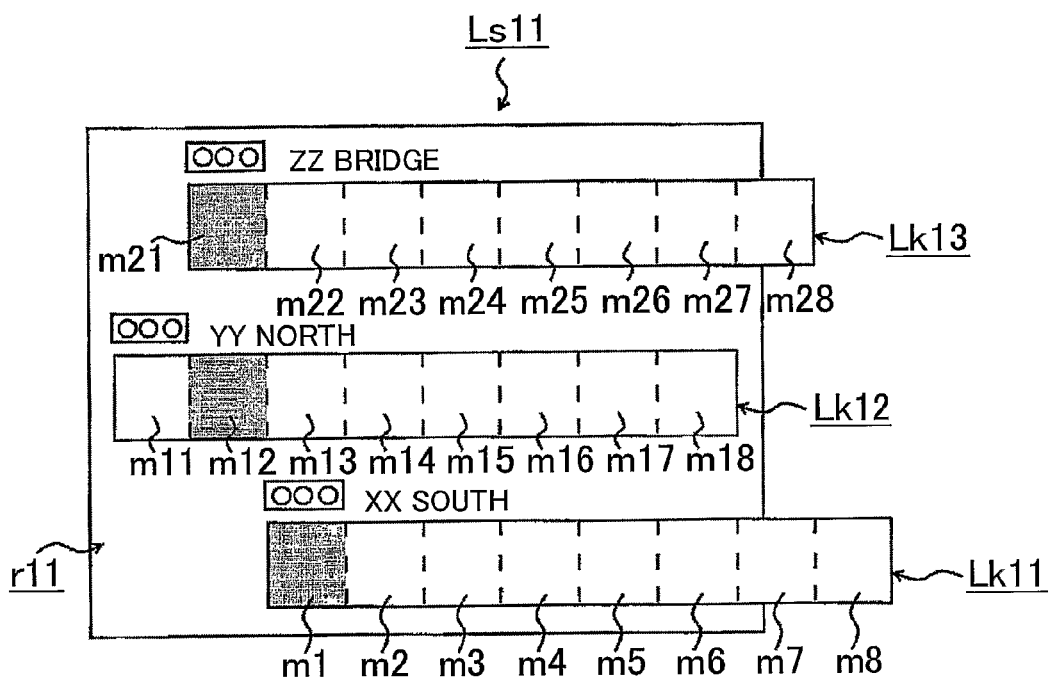
FIG. 15 is a first drawing that shows an example of the display of the lane list in the first embodiment of the present invention.
Figure 16:
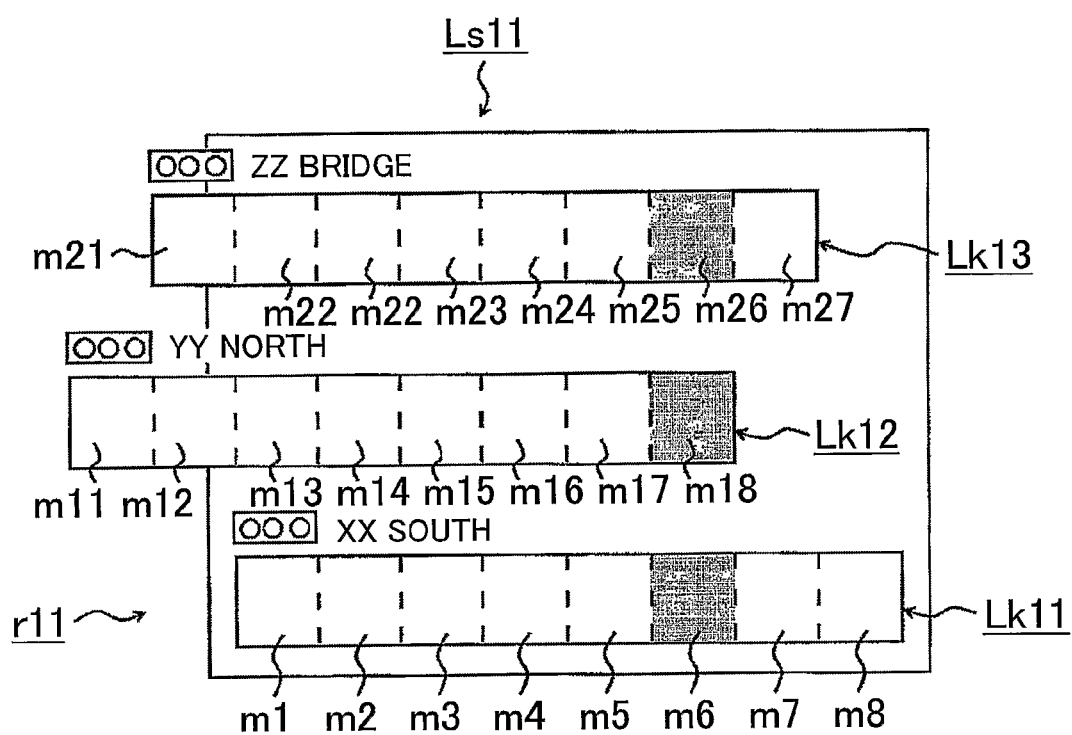
FIG. 16 is a second drawing that shows an example of the display of the lane list in the first embodiment of the present invention.

FIG. 4 is a flowchart that shows the operation of the lane display processing means in the first embodiment of the present invention; FIG. 5 is a drawing that shows an example of a lane list that takes into account the connections between lanes in the first embodiment of the present invention; FIG. 6 is a first drawing that shows the recommended lane position determining process method in the first embodiment of the present invention; FIG. 7 is a second drawing that shows the recommended lane position determining process method in the first embodiment of the present invention; FIG. 8 is a third drawing that shows the recommended lane position determining process method in the first embodiment of the present invention; FIG. 9 is a fourth drawing that shows the recommended lane position determining process method in the first embodiment of the present invention; FIG. 10 is a fifth drawing that shows the recommended lane position determining process method in the first embodiment of the present invention; FIG. 11 is a sixth drawing that shows the recommended lane position determining process method in the first embodiment of the present invention; FIG. 12 is a seventh drawing that shows the recommended lane position determining process method in the first embodiment of the present invention; FIG. 13 is a eighth drawing that shows the recommended lane position determining process method in the first embodiment of the present invention; FIG. 14 is a ninth drawing that shows the recommended lane position determining process method in the first embodiment of the present invention; FIG. 15 is a first drawing of an example of a lane list in the first embodiment of the present invention; FIG. 16 is a second drawing of an example that shows the lane list in the first embodiment of the present invention.

First, the lane list setting processing means in the lane display processing means carries out the lane list setting processing, the position of the guided vehicle, the road data, the intersection data and the like are read, a section within the range of a predetermined distance ahead of the position of the guided vehicle is set as the lane list display section, and a lane list is produced for each of the road links ahead of each of the intersections within the lane list display section.

In connection with this, in the case in which only one intersection is present within the lane list display section, it is possible to render the lane list for the road links ahead of the intersection as-is. However, it may not be possible to display the lane as-is depending on the size thereof in the case in which two or more intersections are present within the lane list display section, and the lane list is one in which it is possible to travel forward without moving between lanes from the entry road to the exit road at each intersection and that takes into consideration the connections between each of the lanes such that the entry road and the exit road are connected.

Thus, a connection determination processing means in the lane display processing means carries out connection determination processing, and as shown in FIG. 5, determines whether or not the lane list is one that takes into account the connections between each of the lanes.

As shown in FIG. 5, reference numeral Ls11 is a lane list, and this lane list Ls11 is formed by each of the intersections of the "XX South", "YY North", and "ZZ Bridge", which are within the lane list display section and have traffic signals, and the "ZZ Bridge" is a guided intersection at which left turn guidance is carried out on the retrieved route. In addition, reference numeral r11 is a road, Lk11 is a lane group that consists of the road link from the position of the guided vehicle to the "XX South" intersection, Lk12 is a lane group that consists of the road link from the "XX South" intersection to the "YY North" intersection, and Lk13 is a lane group that consists of the road link from the "YY North" intersection to the "ZZ Bridge" intersection.

The lane group Lk11 includes lanes m1 to m8, lane group Lk12 includes lanes m11 to m18, and lane group Lk13 includes lanes m21 to m28, and in each of the lane groups Lk11 to Lk13, the lanes m1, m12, and m21 are displayed as recommended lanes.

In addition, in the lane list Ls11, a traffic section is set in which the forward travel direction for each of the lanes m1 to m8, m11 to m18, and m21 to m28 is indicated, and arrows (not illustrated) are appended that indicate the forward travel direction in each of the traffic sections.

In addition, lanes m1, m12, and m21 are recommended lanes, and thus they are displayed making the color of the background that surrounds the arrows different so that they can be distinguished from the other lanes.

Therefore, in the case of turning left at the "ZZ Bridge" intersection after travelling forward along the road r11 to the "ZZ Bridge" intersection on the retrieved route, lane guidance is carried out such that the vehicle will pass through, in sequence, lanes m1, m12, and m21.

In this connection, in the actual road r11, as shown in FIG. 5, in the case in which lane m1 and lane m13 are connected and lane m12 and lane m21 are connected, when the vehicle travels along lanes m1, m12, and m21, which are recommended lanes, in the road link from the position of the guided vehicle to the "XX South" intersection, the vehicle travels along lane m1, then enters lane m13 at the "XX South" intersection, moves from lane m13 to lane m12 in the road link between the "XX South" intersection and the "YY North" intersection, enters lane m21 at the "YY North" intersection, travels along lane m21 in the road link between the "YY North" intersection and the "ZZ Bridge" intersection, and turns left at the "ZZ Bridge" intersection.

Thus, a lane list Ls11 is displayed by taking into account the connections between each of the lanes m1 to m8, m11 to m18, and m21 to 28 between the lane groups Lk11 and Lk13 on each of the road links such that, at each of the intersections such as those that are shown in FIG. 5, the entrance roads that enter the intersection and the exit roads that exit from the intersection are linked so that it is possible for the driver to recognize whether nor not changing lanes is necessary within each of the road links and how the lane change must be carried out.

In addition, in the case in which the lane list Ls11 is one that takes into account the connections between each of the lanes m1 to m8, m11, to m18, and m21 to m28, the rendering range determination processing means in the lane display processing means carries out rendering range determination processing, and determines whether or not the size of the lane list Ls11 is larger than the maximum rendering range of the lane display unit, that is, whether or not the number of lanes in the lane list Ls11 is larger than the number of lanes that has been set in the display unit 35.

For example, in the case in which a lane list Ls11 such as that shown in FIG. 5 is formed, the number of lanes that are arranged between the leftmost lane m11 and the rightmost lane m8, among all of the lanes m1 to m8, m11 to m18, and m21 to m28, is 10 lanes, and the size of the lane list Ls11 is larger than the maximum rendering range of the lane display unit.

Thus, the display range adjustment processing means in the lane display processing means carries out display range adjustment processing, and the display range of the lane list is adjusted so as to conform to the maximum rendering range based on the structure of the lane groups of the road links, or in the present embodiment, based on the position of the recommended lanes in the road links ahead of the guided intersections, predetermined lanes are selected, and only the selected lanes are displayed. In this case, the display range adjustment processing means structures a lane selection processing means, and the lane selection processing means carries out the lane selection processing to select predetermined lanes.

In addition, the recommended lane position determination processing means in the display range adjustment processing means carries out the recommended lane position determination processing, and determines the positions of the recommended lanes in the road links ahead of the guided intersections, that is, in FIG. 5, the positions of the recommended lanes in the road links ahead of the "ZZ Bridge" intersection.

Thus, the recommended lane position determination processing means reads out the intersection data, the lane data, and the like, and in the lane group of the road link ahead of the guided intersection, the number of lanes on the left side of the recommended lane and the number of lanes on the right side of the recommended lane are compared. In the case that the number of lanes on the right side is larger than the number of lanes on the left side, it is determined that the recommended lane is toward the left in the road link, and in the case in which the number of lanes on the right side is smaller than the number of lanes on the left side, it is determined that the recommended lane is toward the right in the road link, and in the case in which the number of lanes on the left side and the number of lanes on the right side are equal, it is determined that the recommended lane is in the center of the road link.

For example, as shown in FIG. 6, in the case in which the lane group of a road link ahead of a guided intersection consists of lanes n1 to n8 and lane n3 is the recommended lane, the number of lanes on the left side of the recommended lane is 2, and the number of lanes on the right side of the recommended lane is 5. In this case, the recommended lane position determination processing means determines that the recommended lane is toward the left in the road link.

For example, as shown in FIG. 7, in the case in which a lane group of a road link ahead of a guided intersection consists of lanes n1 to n7 and lane n6 is the recommended lane, the number of lanes on the left side of the recommended lane is 5, and the number of lanes on the right side of the recommended lane is 1. In this case, the recommended lane position determination processing means determines that the recommended lane is toward the right in the road link.

In addition, as shown in FIG. 8, in the case in which a lane group of a road link ahead of a guided intersection consists of lanes n1 to n7 and lane n4 is the recommended lane, the number of lanes on the left side and the number of lanes on the right side of the recommended lane are both equal to 3. In this case, the recommended lane position determination processing means determines that the recommended lane is in the center of the road link.

Note that in the case in which recommended lanes are present in plurality, the recommended lane position determination processing means carries out a determination after comparing the number of lanes on the left side of the recommended lanes and the number of lanes on the right side of the recommended lanes.

For example, as shown in FIG. 9, in the case in which the lane group of a road link ahead of a guided intersection consists of lanes n1 to n8, and lanes n3 and n4 are the recommended lanes, the number of lanes on the left side of the recommended lanes is 2, and the number of lanes on the right side of the recommended lanes is 4. In this case, the recommended lane position determination processing means determines that the recommended lanes are toward the left in the road link.

In addition, as shown in FIG. 10, in the case in which the lane group of a road link ahead of a guided intersection consists of lanes n1 to n8, and lanes n1 to n7 are the recommended lanes, the number of lanes on the left side of the recommended lanes is 0 (zero), and the number of lanes on the right side of the recommended lanes is 1. In this case, the recommended lane position determination processing means determines that the recommended lanes are toward the left in the road link.

In addition, as shown in FIG. 11, in the case in which a lane group of a road link ahead of a guided intersection consists of lanes n1 to n8, and lanes n4 to n6 are the recommended lanes, the number of lanes on the left side of the recommended lanes is 3, and the number of lanes on the right side of the recommended lanes is 2. In this case, the recommended lane position determination processing means determines that the recommended lanes are toward the right in the road link.

In addition, as shown in FIG. 12, in the case in which a lane group of a road link ahead of a guided intersection consists of lanes n1 to n7, and lanes n4 and n5 are the recommended lanes, the number of lanes on the left side of the recommended lanes is 3, and the number of lanes on the right side of the recommended lanes is 2. In this case, the recommended lane position determination processing means determines that the recommended lanes are toward the right in the road link.

In addition, as shown in FIG. 13, in the case in which a lane group of a road link ahead of a guided intersection consists of lanes n1 to n7, and lanes n3 to n5 are the recommended lanes, the number of lanes on the left side of the recommended lanes and the number of lanes on the right side of the recommended lanes are both equal to 2. In this case, the recommended lane position determination processing means determines that the recommended lanes are at the center in the road link.

In addition, as shown in FIG. 14, in the case in which a lane group of a road link ahead of a guided intersection consists of lanes n1 to n5, and lanes n1 to n5 are the recommended lanes, the number of lanes on the left side of the recommended lanes and the number of lanes on the right side of the recommended lanes are both equal to 0. In this case, the recommended lane position determination processing means determines that the recommended lanes are at the center in the road link.

In this manner, when the position of a recommended lane in a road link ahead of a guided intersection has been determined, the display range determination processing means in the display range adjustment processing means carries out the display range determination processing, and as a result of the determination of the recommended lane position determination processing, in this case, a display range of the lane list is determined based on the position of the lane list.

Specifically, in a road link ahead of a guided intersection, in the case in which the recommended lane is toward the left in the road link, it can be determined there is a high probability that the driver will travel toward the left of the road from the position of the guided vehicle toward the recommended lane at the guided intersection. Thus, the display range determination processing means determines the display range such that, among the lanes of the lane list, the lanes on the leftmost side fit in the case in which the recommended lane is toward the left in the road link.

In addition, in a road link ahead of a guided intersection, in the case in which the recommended lane is toward the right in the road link, it can be determined that there is a high probability that the driver will travel toward the right of the road from the position of the guided vehicle toward the recommended lane at the guided intersection. Thus, in the case in which the recommended lane is toward the right in the road link, the display range determination processing means determines the display range such that, among the lanes in the lane list, the lanes on the rightmost side fit.

In addition, in a road link ahead of a guided intersection, in the case in which the recommended lane is at the center of the road link, the display range determination processing means determines a display range based on the exit direction at the guided intersection.

That is, in the case in which the exit direction in a guided intersection is toward the left, it can be determined that there is a high probability that the driver will travel on the left of the road from the position of the guided vehicle toward the recommended lane in the road link ahead of the guided intersection. Thus, in the case in which the retrieved route is set such that the vehicle will turn left, the display range determination processing means determines the display range such that, among the lanes in the lane list, the leftmost lanes fit.

In addition, in the case in which the exit direction in a guided intersection is toward the right, it can be determined that there is a high probability the driver will travel on the right of the road from the position of the guided vehicle toward the recommended lane in the road link ahead of the guided intersection. Thus, in the case in which the retrieved route is set such that the vehicle will turn right, the display range determination processing means sets the display range such that, among the lanes in the lane list, the rightmost lanes fit.

In addition, in the case in which the exit direction in a guided intersection is the forward travel direction, it can be determined there is a high probability that the driver will travel in the center of the road from the position of the guided vehicle toward the recommended lane in the road link ahead of the guided intersection. Thus, in the case in which the retrieved route is set such that the vehicle will travel forward, the display range determination processing means determines the display range such that the middle portion of the lane list fits.

Note that in the case in which the recommended lane is at the center in the road link, the display range determination processing means can determine the display range such that all of the lane groups at the road link ahead of the guided intersection fit. In addition, in the case in which the recommended lane is at the center in the road link, generally, preferably the vehicle travels at the left of the road, and thus the display range determination processing means can determine the display range such that, among the lanes in the lane list, the leftmost lanes fit. Furthermore, in the case in which the recommended lane is at the center in the road link, the display range determination processing means can determine the display range after removing the lanes on the left side and the right side so that, among the lanes in the lane list, the middle portion fits.

Therefore, for example, as shown in FIG. 15, in the case in which the link group of the road link ahead of the "ZZ Bridge", which is a guided intersection, consists of lanes m21 to m28, and lane m21 is the recommended lane, the number of lanes on the left side of the recommended lane is 0, and the number of lanes on the right side of the recommended lane is 7. In this case, the recommended lane position determination processing means determines that the recommended lane is toward the left in the road link.

In addition, the display range determination processing means determines the display range such that, among the lanes m1 to m8, m11 to m18, and m21 to m28, the leftmost lane m11 in the lane list Ls11 fits. As a result, lanes m7, m8, and m28 are removed from the display range.

In addition, for example, as shown in FIG. 16, in the case in which lanes m6, m18, and m26 are the recommended lanes, the link group of the road link ahead of the "ZZ Bridge", which is a guided intersection, consists of lanes m21 to m27, and lane m26 is the recommended lane. Thus, the number of lanes on the left side of the recommended lane is 6, and the number of lanes on the right side of the recommended lane is 1. In this case, the recommended lane position determination processing means determines that the recommended lane is toward the right in the road link.

In addition, the display range determination processing means determines the display range such that, among the lanes m1 to m8, m11 to m18, and m21 to m28, the right most lane m8 in the lane list Ls11 fits. As a result, lanes m11, m12, and m21 are removed from the display range.

In this manner, the display range of the lane list is determined based on the position of the recommended lane in the road link ahead of a guided intersection, and the lanes that have a low display necessity are removed from the display range. Thus, it is possible to display reliably the main portion of a lane list that takes into account the connections between the lanes.

In addition, because it is not necessary to make the size of each of the rendered lanes small, it is possible to prevent the visibility of the lane list from being reduced.

Next, the flowchart in FIG. 4 will be explained.

Step S1: It is determined whether or not the lane list is one that takes into account connections. In the case in which the lane list is one that takes in to account connections, the processing proceeds to step S2, and in the case in which the lane list is not one that takes into account the connections, the processing proceeds to RETURN.

Step S2: It is determined whether or not the size of the lane list is larger than the maximum rendering range. In the case in which the size of the lane list is larger than the maximum rendering range, the processing proceeds to step S3, and in the case in which the size of the lane list is equal to or less than the maximum rendering range, the processing proceeds to RETURN.

Step S3: The position of the recommended lane in the road link ahead of the guided intersection is determined.

Step S4: The range that is to be displayed is determined based on the position of the recommended lane, and the processing proceeds to RETURN.

Next, a second embodiment of the present invention will be explained. Note that portions that have structures that are identical to those of the first embodiment are denoted by identical reference numerals, and the effects of the invention that are due to having the identical structure are incorporated into the effects of the this embodiment.

Figure 17:
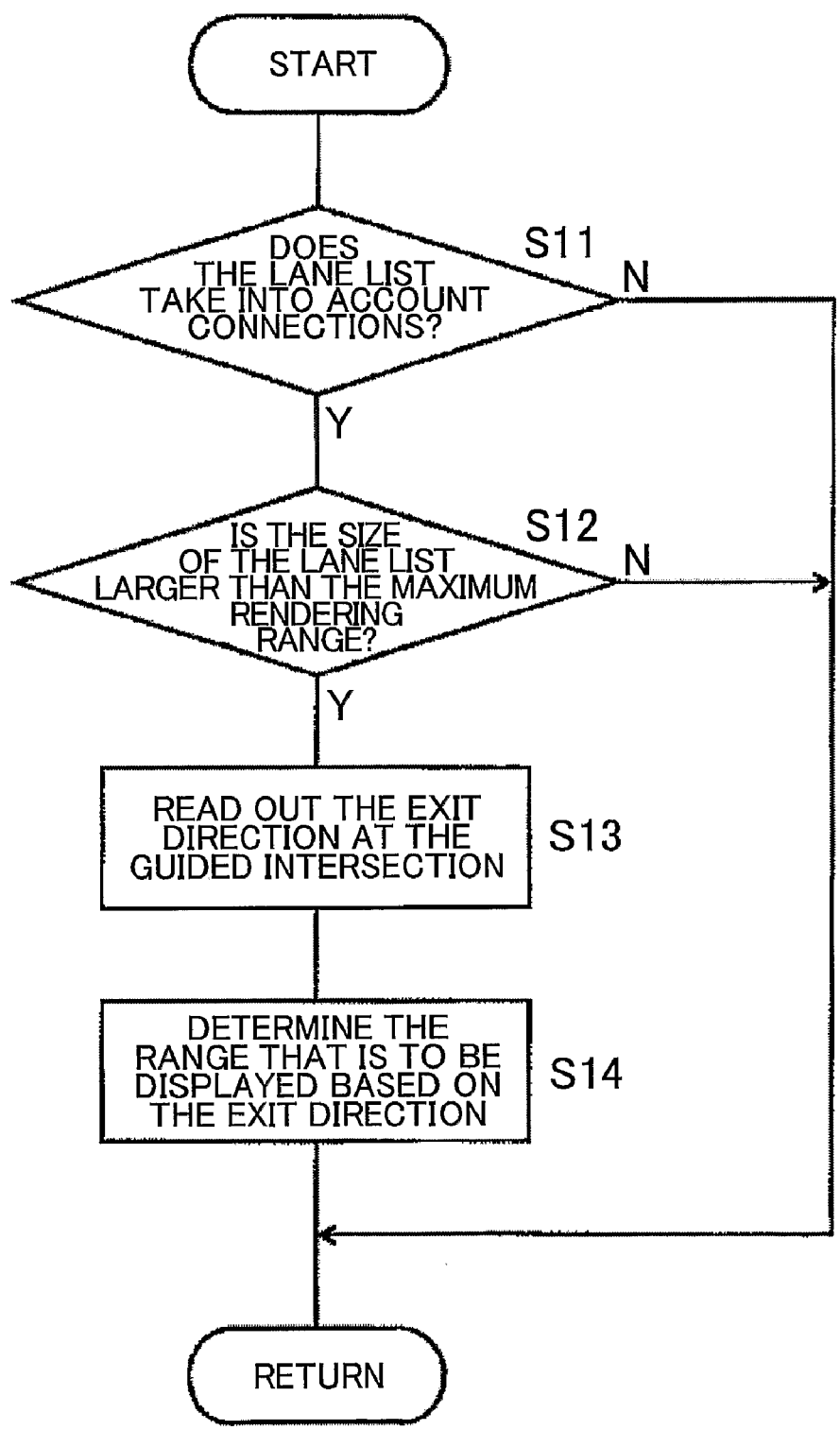
FIG. 17 is a flowchart that shows the operation of the lane display processing means in a second embodiment of the present invention.
Figure 18:
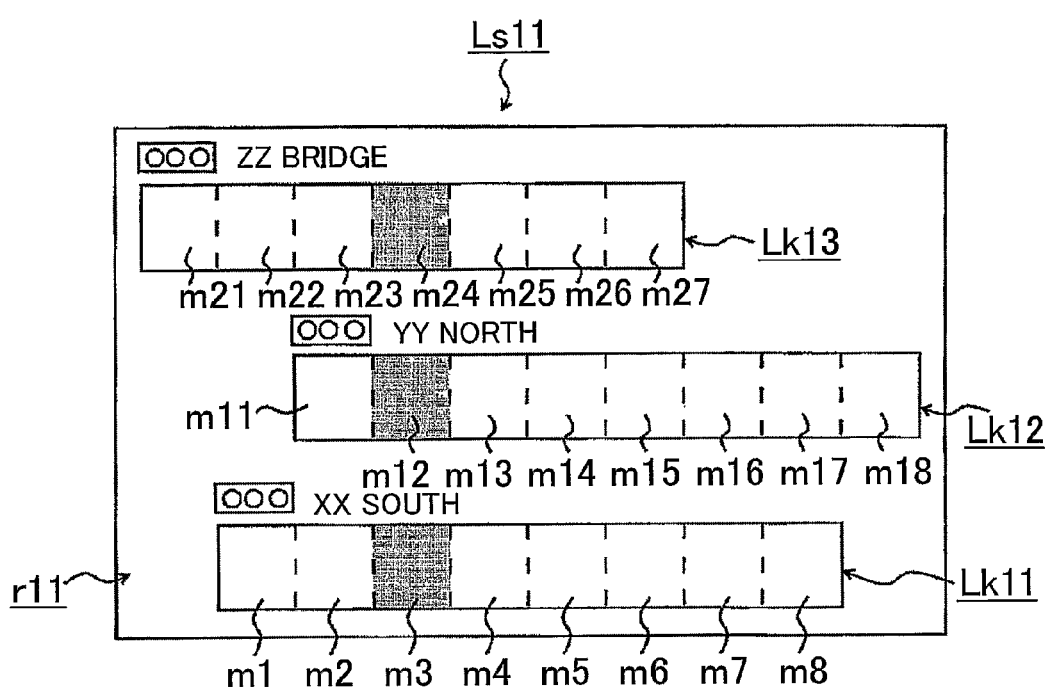
FIG. 18 is a drawing that shows an example of a display of the lane list that takes into account the connections between lanes in the second embodiment of the present invention.
Figure 19:
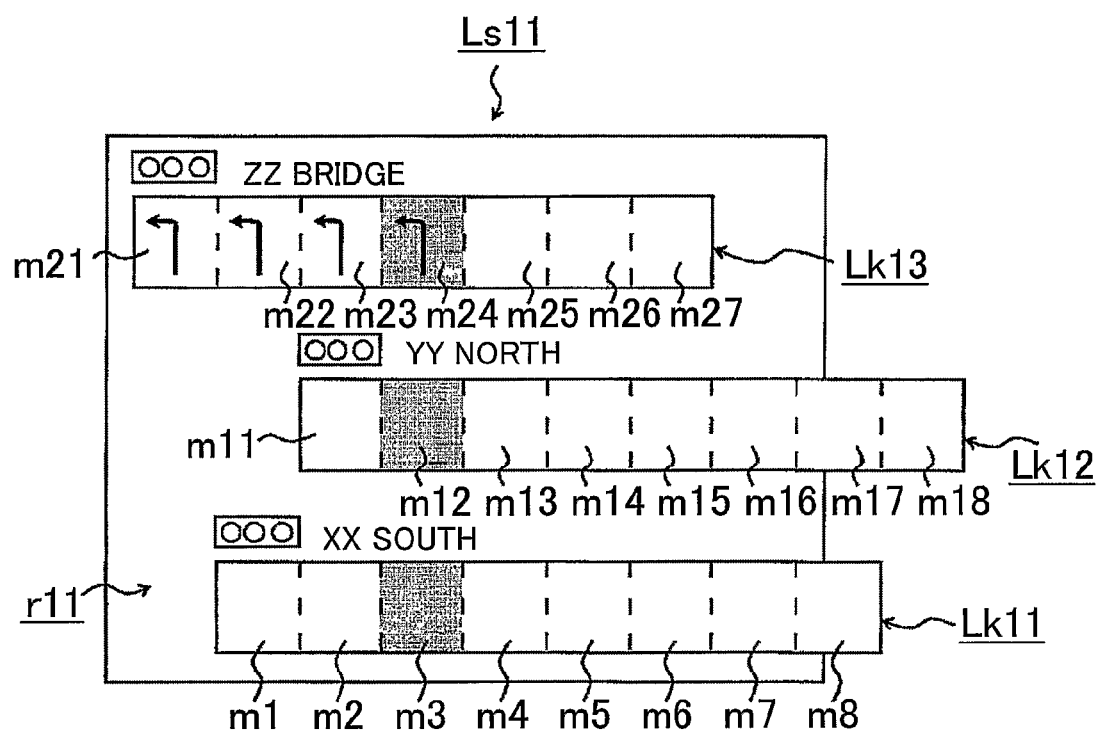
FIG. 19 is a first drawing that shows an example of the display of the lane list in the second embodiment of the present invention.
Figure 21:
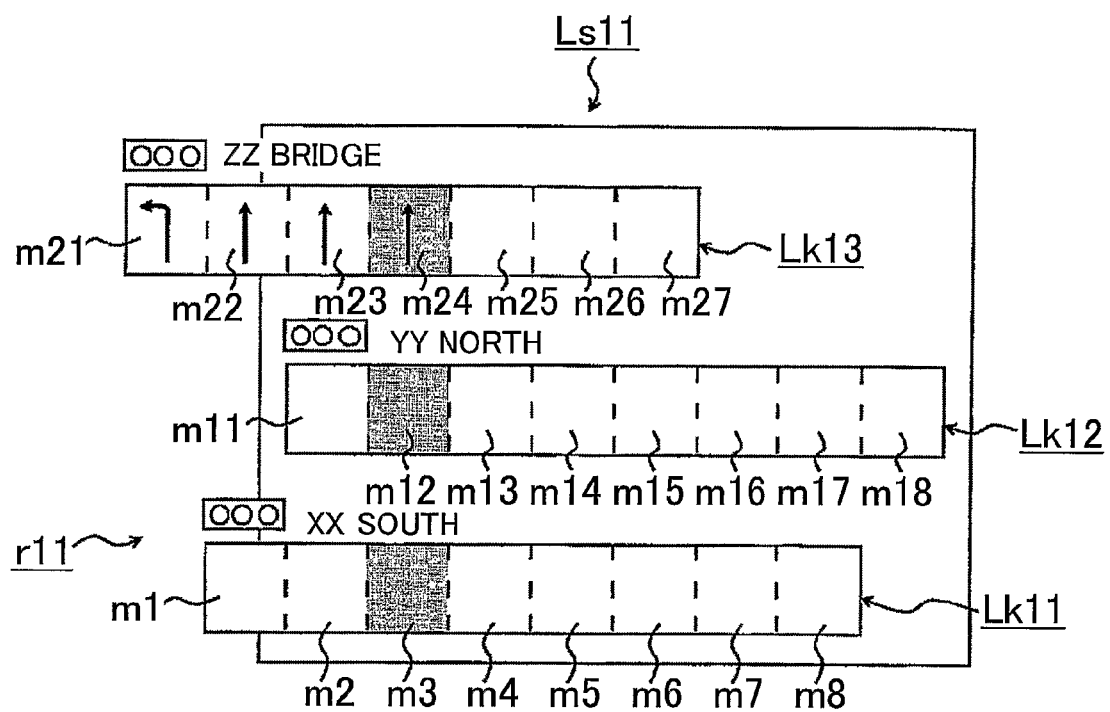
FIG. 21 is a third drawing that shows an example of the display of the lane list in the second embodiment of the present invention.

FIG. 17 is a flowchart that shows the operation of the lane display processing means in a second embodiment of the present invention. FIG. 18 is a drawing that shows an example of the display of a lane list that takes into account the connections between lanes in the second embodiment of the present invention. FIG. 19 is a first drawing that shows an example of the display of the lane list in the second embodiment of the present invention. FIG. 20 is a second drawing that shows an example of the display of the lane list in the second embodiment of the present invention. FIG. 21 is a third drawing that shows an example of the display of the lane list in the second embodiment of the present invention.

In this case, the lane group Lk11 consists of lanes m1 to m8, the lane group Lk12 consists of lanes m11 to m18, and the lane group Lk13 consists of lanes m21 to m27, and in the lane groups Lk11 to Lk13, the lanes m3, m12, and m24 are displayed as recommended lanes.

In addition, in the present embodiment, the display range adjustment processing means adjusts the display range of the lane list so as to conform to the maximum rendering range based on the structure of the lane group of the road link, or in the present embodiment, based on the exit direction in the guided intersection, selects predetermined lanes, and displays only the selected lanes.

In addition, the exit direction determination processing means in the display range adjustment processing means carries out exit direction determination processing, and the exit direction at the intersection, that is, in the example in FIG. 18, the exit direction in the "ZZ Bridge" intersection, is determined. Thus, the exit direction determination processing means reads out the intersection data, the lane data, and the like, determines the exit direction in the guided intersection, and determines whether the exit direction is in the left direction, the right direction, or in the direction of forward travel.

Next, when the exit direction in the guided intersection has been determined, as a result of the determination of the exit direction determination processing, in this case, the display range determination processing means determines the display range of the lane list based on the orientation of the exit direction.

Specifically, in the case in which the exit direction at the guided intersection is to the left, it can be determined that there is a high probability that the driver will travel toward the left of the road from the position of the guided vehicle toward the recommended lane in the road link ahead of the guided intersection. Thus, the display range determination processing means determines the display range such that, among the lanes in the lane list, the leftmost lanes fit in the case in which the exit direction in the guided intersection is to the left.

In addition, in the case in which the exit direction at the guided intersection is to the right, it can be determined that there is a high probability that the driver will travel toward the right of the road from the position of the guided vehicle toward the recommended lane in the road link ahead of the guided intersection. Thus, the display range determination processing means determines the display range such that, among the lanes in the lane list, the rightmost lanes fit in the case in which the exit direction at the guided intersection is to the right.

In addition, in the case in which the exit direction at the guided intersection is the direction of forward travel, it is determined that there is a high probability that the driver will travel in the center of the road from the position of the guided vehicle toward the recommended lane in the road link ahead of the guided intersection. Thus, the display range determination processing means determines the display range such that the middle portion of the lane list fits in the case in which the exit direction at the guided intersection is the direction of forward travel.

Note that in the case in which the exit direction at the guided intersection is the direction of forward travel, the display range determination processing means can determine the display range such that the all of the lane groups of the road links ahead of the guided intersection fit. In addition, in the case in which the exit direction at the guided intersection is the direction of forward travel, generally the display range determination processing means can determine the display range such that, among the lanes in the lane list, the leftmost lanes fit because preferably the vehicle will travel on the left of the road.

Therefore, for example, as shown in FIG. 19, in the case in which the lanes m21 to m24 in the lane group of the road link ahead of the "ZZ Bridge", which is the guided intersection, are left turn lanes, the exit direction determination processing means determines that the exit direction in the guided intersection is to the left.

In addition, the display range determination processing means determines the display range such that, among the lanes m1 to m8, m11 to m18, and m21 to m27 in the lane list Ls11, the leftmost lane m21 fits. As a result, lanes m8, m17, and m18 are removed from the display range.

In addition, for example, as shown in FIG. 20, in the case in which the lanes m24 to m27 in the lane group of the road link ahead of the "ZZ Bridge", which is the guided intersection, are right turn lanes, the exit direction determination processing means determines that the exit direction in the guided intersection is to the right.

In addition, the display range determination processing means determines the display range such that, among the lanes m1 to m8, m11 to m18, and m21 to m27 in the lane list Ls11, the rightmost lane m18 fits. As a result, lanes m1, m21, and m22 are removed from the lane range.

In addition, for example, as shown in FIG. 21, in the case in which the lane m1 in the lane group of the road link ahead of the "ZZ Bridge", which is the guided intersection, is a left turn lane and the lanes m2 to m4 are through traffic lanes, the exit direction determination processing means determines that the exit direction in the guided intersection is the direction of forward travel.

In addition, the display range determination processing means determines the display range such that the center portion of the lane list Ls11 fits. As a result, lanes m1, m21, and, m22 are excluded from the display range.

In this manner, the display range of the lane list is determined based on the exit direction in the guided intersection, and lanes having a low display necessity are removed from the display range. Thus, it is possible to display the main portion of the lane list that takes into consideration the connections between each of the lanes reliably.

In addition, because it is not necessary to make the size of each of the rendered lanes small, it is possible to prevent the visibility of the lane list from deteriorating.

Next, the flowchart in FIG. 17 will be explained.

Step S11: It is determined whether or not the lane list is one that takes into account connections. In the case in which the lane list is one that takes into account connections, the processing proceeds to step S12, and in the case in which the lane list is not one that takes into account the connections, the processing proceeds to RETURN.

Step S12: It is determined whether or not the size of the lane list is larger than the maximum rendering range. In the case in which the size of the lane list is larger than the maximum rendering range, the processing proceeds to step S13, and in the case that the size of the lane list is equal to or less than the maximum rendering range, the processing proceeds to RETURN.

Step S13: The exit direction at the guided intersection is read out.

Step S14: The range that is to be displayed is determined based on the exit direction, and the processing proceeds to RETURN.

Note that the present invention is not limited by the embodiments, and various modifications based on the spirit of the present invention are possible, and these are not excluded from the scope of the present invention.

INDUSTRIAL APPLICABILITY

The present invention can be applied to navigation systems for displaying the lanes of a lane list.

The invention claimed is:

1. A route guidance system comprising:
   a current position detecting unit that detects a current position of a vehicle as a position of a guided vehicle;
   a lane guidance unit that executes lane guidance such that the vehicle passes through, in sequence, a recommended lane of a lane group for each of a plurality of road links;
   a lane list display section setting unit that sets a section within a range of a predetermined distance ahead of the position of the guided vehicle as a lane display section based on the position of the guided vehicle, road data, and intersection data;
   a lane list setting processing unit that determines connections between lanes of the lane groups at each of the road links, such that, at each of the intersections, entrance roads that enter the intersection and exit roads that exit from the intersection are linked;
   the lane list setting processing unit that produces a lane list, wherein the lane list comprises the plurality of lane groups with connections between each lane of a lane group of each road link that is present in the lane list display section at each intersection within the predetermined distance ahead of the position of the guided vehicle;
   a rendering range determination processing unit that determines whether or not a number of lanes in the lane list is larger than a number of lanes set in a display unit;
   a display range adjustment processing unit that adjusts the display range of the lane list to conform to the maximum rendering range of the display unit based on the structure of the lane groups of the road links and the position of the recommended lane in the road links ahead of a guided intersection; and
   the display range determination processing unit that, in a case in which the number of lanes in the lane list is larger than the number of lanes set in the display unit, displays via the display unit the lanes of the road link corresponding to an exit direction from the guided intersection that are selected to fit within a display range.

2. The route guidance system according to claim 1, wherein the display range determination processing unit is configured to determine the display range of the lane list by comparing a number of lanes on a right side of the recommended lane with a number of lanes on a left side of the recommended lane.

3. The route guidance system according to claim 1, further comprising:
   a route search processing unit configured to search for a retrieved route to a destination based on the position of the guided vehicle, and
   an exit direction determination processing unit configured to determine an exit direction in the guided intersection, for which guidance is provided about a route in a lane list display section,
   wherein the display range determination, processing unit is configured to determine the display range of the lane list based on the exit direction in the guided intersection.

4. A non-transitory computer readable medium having executable instructions embodied thereon that when executed by a computer perform the following steps:
   detecting, via a current position detecting unit, a current position of a vehicle as a position of a guided vehicle;
   executing, via a lane guidance unit, lane guidance such that the vehicle passes through, in sequence, a recommended lane of a lane group for each of a plurality of road links;
   setting, via a lane list display section setting unit, a section within a range of a predetermined distance ahead of the position of the guided vehicle as a lane display section based on the position of the guided vehicle, road data, and intersection data;
   determining, via a lane list setting processing unit, connections between lanes of the lane groups at each of the road links, such that, at each of the intersections, entrance roads that enter the intersection and exit roads that exit from the intersection are linked;
   producing, via the lane list setting processing unit, a lane list, wherein the lane list comprises the plurality of lane groups with connections between each lane of a lane group of each road link that is present in a lane list display section at each intersection within a predetermined distance ahead of a position of a guided vehicle;
   determining, via a rendering range determination processing unit, whether or not the number of lanes in the lane list is larger than a number of lanes set in a display unit;
   adjusting, via a display range adjustment processing unit, the display range of the lane list to conform to the maximum rendering range of the display unit based on the structure of the lane groups of the road links and the position of the recommended lane in the road links ahead of a guided intersection; and
   displaying, via the display unit, via the display range determination processing unit, in a case in which the number of lanes in the lane list is larger than the number of lanes set in the display unit, lanes of the road link corresponding to an exit direction from the guided intersection that are selected to fit within the display range.

5. The non-transitory computer readable medium according to claim 4, wherein determining the display range of the lane list further comprises comparing a number of lanes on the right side of the recommended lane with a number of lanes on a left side of the recommended lane.

6. The non-transitory computer readable medium according to claim 4, further comprising:
   searching for a retrieved route to a destination based on the position of the guided vehicle, and
   determining the exit direction in the guided intersection, for vehicle guidance is provided about a route in the lane list display section,
   wherein determining the display range of the lane list is based on the exit direction in the guided intersection.

* * * * *